United States Patent
Peter

[15] 3,681,634
[45] Aug. 1, 1972

[54] POLE COIL STRUCTURE FOR DYNAMO-ELECTRIC MACHINE

[72] Inventor: Peter Peter, Wettingen, Switzerland

[73] Assignee: Aktiengesellschaft Brown, Boveri & Cie, Baden, Switzerland

[22] Filed: Feb. 18, 1971

[21] Appl. No.: 116,350

[30] Foreign Application Priority Data

Feb. 25, 1970 Switzerland .................. 2795/70

[52] U.S. Cl. ..................................... 310/218, 310/269
[51] Int. Cl. ............................................. H02k 3/18
[58] Field of Search ...... 310/201, 208, 180, 194, 269, 310/216, 218

[56] References Cited

FOREIGN PATENTS OR APPLICATIONS 615,058   12/1948   Great Britain ................ 310/218
722,417   1/1955    Great Britain ................ 310/194
624,228   5/1949    Great Britain ................ 310/201

Primary Examiner—D. F. Duggan
Attorney—Pierce, Scheffler & Parker

[57] ABSTRACT

A pole coil structure for use on a dynamo-electric machine wherein each of the series connected turns of the coil has a rectangular configuration to match the pole configuration and is formed from a plurality of relatively rigid rectilinear flat strips connected together in end-to-end relation solely by means of positive, self-locking and press-fitted joints of the dovetail type which function both as an electrical as well as mechanical connections.

4 Claims, 3 Drawing Figures

PATENTED AUG 1 1972 3,681,634

POLE COIL STRUCTURE FOR DYNAMO-ELECTRIC MACHINE

The present invention relates to an improvement in the construction of electrical coils for use on the poles of dynamoelectric machines. More particularly, the invention is directed to an improvement for pole coils of the type wherein each turn of the coil is formed from a plurality of relatively rigid rectangular conductor sections in the form of flat strips connected together in end-to-end relation to establish the sides of a polygonal coil having a configuration corresponding to and surrounding the pole core as distinguished from an alternative arrangement wherein the coil is formed by winding the turns from a continuous length of the conductor material.

It is already known to form a pole coil from rectilinear conductor sections connected in end-to-end relation by welding the ends together but this mode of constructing the coil is relatively complicated, requires specialists for producing the welded connection, and also makes it necessary to re-machine the weld seams so as to remove any excess material exceeding the thickness of the strips.

The principal object of the present invention is to provide an improved construction for pole coils of the above-mentioned type wherein the individual conductor sections are connected end-to-end but which has none of the disadvantages of the prior known techniques. The new mode of construction is mechanically and electrically satisfactory and also can be fabricated by semi-skilled personnel, and to that extent is more economical to produce.

More particularly, the improved coil structure in accordance with the invention is principally characterized by the fact that the end-to-end connections between the conductor strips are established solely by a positive, self-interlocking and pressed fit preferably in the form of a dovetail type of joint which functions both as an electrical as well as a mechanical connection between the ends of adjacent conductor strips, thus eliminating any necessity for welding or soldering these junctions.

Advantageously, the junctions between the ends of the several conductor strips which form one turn of the coil are staggered longitudinally with respect to the junctions between the ends of the conductor strips which establish an adjacent turn of the coil, thus providing longitudinal overlaps between the junctions of adjacent turns of the coil.

In accordance with a further object of the invention, the individual conductor sections are provided at their ends with a junction presenting a bright surface produced by precision stamping or precision cutting whereby the ends of adjacent sections are interconnected both mechanically and electrically by force pressing the junctions each into the other.

The foregoing as well as other objects and advantages inherent in the invention will become more apparent from the following detailed description of a preferred embodiment when considered with the accompanying drawings wherein.

Figure 1:
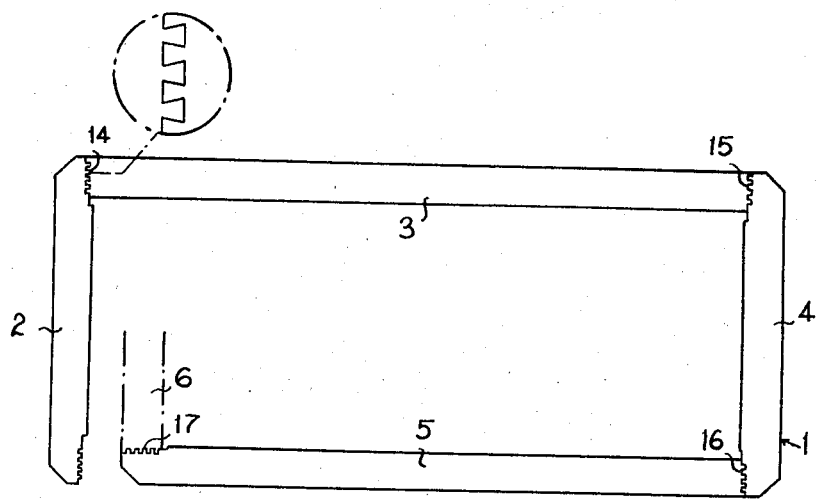
FIG. 1 is a plan view of a first turn of the coil on the pole core as depicted in FIG. 3.

With reference now to the drawings, the first turn 1 of the coil, i.e., the turn on the pole core 13 closest to the pole shoe 13a is seen to have an elongated rectangular configuration corresponding to the configuration of the pole core and consists of four rectilinear conductor sections in the form of relatively rigid flat strips 2, 3, 4 and 5 of electrically conductive material which form the long (3,5) and short (2,4) sides of the rectangle. The four strips are joined in end-to-end relation at the corners of the rectangle by mechanical jointing of complementary configured interfitting teeth and slots which establish positive interlocked and forced fits, preferably in the form of dovetailed connections 14, 15 and 16, as illustrated. The dovetails have "bright" surfaces obtained by precision stamping or precision cutting whereby upon interconnection of the individual conductor sections by pressing the complementary mating ends together one obtains close joints which are both mechanically and electrically satisfactory. In the precision stamping or cutting of the dovetail junctions care must be taken such that "bright," i.e., clean surfaces extending normal to the plane of the strip are formed and that no fractures arise, in order that the electrical connections between the ends offer no contact resistances.

It will be noted from FIG. 1 that the left end portion of conductor strip 5 is broken away and set in so as to show the dovetail connection 17 with the end of conductor strip 6 of the next adjacent turn 10. However, as is obvious, conductor strip 6 actually coincides with conductor strip 2.

Figure 2:
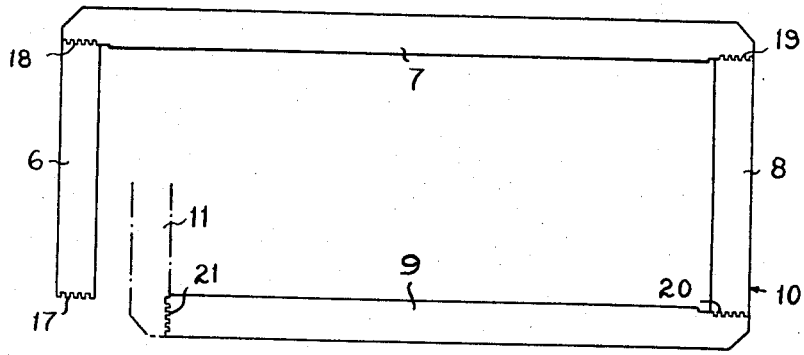
FIG. 2 is also a plan view showing the second turn of the coil which lies adjacent the first turn.

The second turn 10 of the coil connected electrically in series with the first turn is depicted in FIG. 2 and is similar to the first turn 1 in that it is formed by the four flat strips 6, 7, 8 and 9 jointed together at their ends by dovetail connections 18, 19 and 20. As in the case of FIG. 1, the left end portion of conductor strip 9 is broken away and offset to show the dovetail connection 21 with conductor strip 11 of the third turn 100 which coincides in position with conductor strip 6.

It will be observed from FIGS. 1 and 2 that the pairs of dovetail junctions 14, 18, 15, 19, 16, 20 and 17, 21 at corresponding corners of the rectangle are offset in such manner as to avoid coincidence. By so staggering the paired junctions at the corners of adjacent turns, each corner junction area of one turn will find lateral support from a non-junction corner surface area of the adjacent turn of the coil.

It will be further observed from FIGS. 1 and 2 that with respect to turns of the coil which are structured according to FIG. 1, conductor strip 3 can be made without any waste since both ends thereof are non-chamfered; similarly conductor strips 6 and 8 of turns structured in the manner of FIG. 2 can also be made without material waste since these are likewise non-chamfered.

Figure 3:
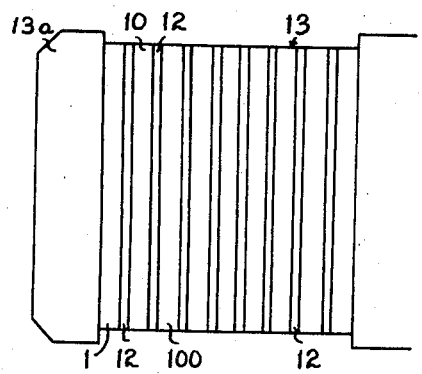
FIG. 3 is a side view of the pole core and coil, the core having an elongated rectangular configuration and the view showing one of the narrow sides thereof.

As shown in FIG. 3, adjacent series connected turns 1, 10, 100, etc. of the coil are mutually electrically insulated each from the other by interposing a layer 12 of insulating material between adjacent turns.

In conclusion, by structuring the pole coil in the manner according to the invention by using mechanically interlocked joints at the ends of the conductor strips and with the help of stamping and pressing devices, it is possible to produce an entirely satisfactory coil even with semi-skilled personnel. Moreover, it has been found that after several years of experimental use, the pole coils produced in this manner remained entirely satisfactory both from a mechanical as well as an electrical standpoint.

I claim:

1. In a pole coil structure for a dynamo-electric machine constituted by a plurality of turns connected electrically in series, the improvement wherein each turn of the coil is constituted by a plurality of conductor strips mechanically and electrically jointed in end-to-end relation solely by complementary configured interfitting teeth and slots located across the ends of the strips and which form a positive interlock and forced fit.

2. A pole coil structure as defined in claim 1 for dynamo-electric machines wherein the interfitting teeth and slots at the ends of the conductor strips form a dovetail joint.

3. A pole coil structure as defined in claim 1 for dynamo-electric machines wherein the junctions between the ends of the conductor strips forming one turn of the coil are staggered in relation to the junctions between the ends of the conductor strips forming an adjacent turn whereby the junction areas of the strips of one turn obtain lateral support from non-junction surface portions of the strips forming an adjacent turn.

4. A pole coil structure as defined in claim 1 for a dynamo-electric machine wherein the positive interlock and forced fit characteristics of the junctions between the ends of the conductor strips are established by precision stamping or cutting of the teeth and slot surfaces.

* * * * *